March 12, 1935. E. SIELOFF 1,994,078
REFRIGERATING SYSTEM
Filed Feb. 11, 1933
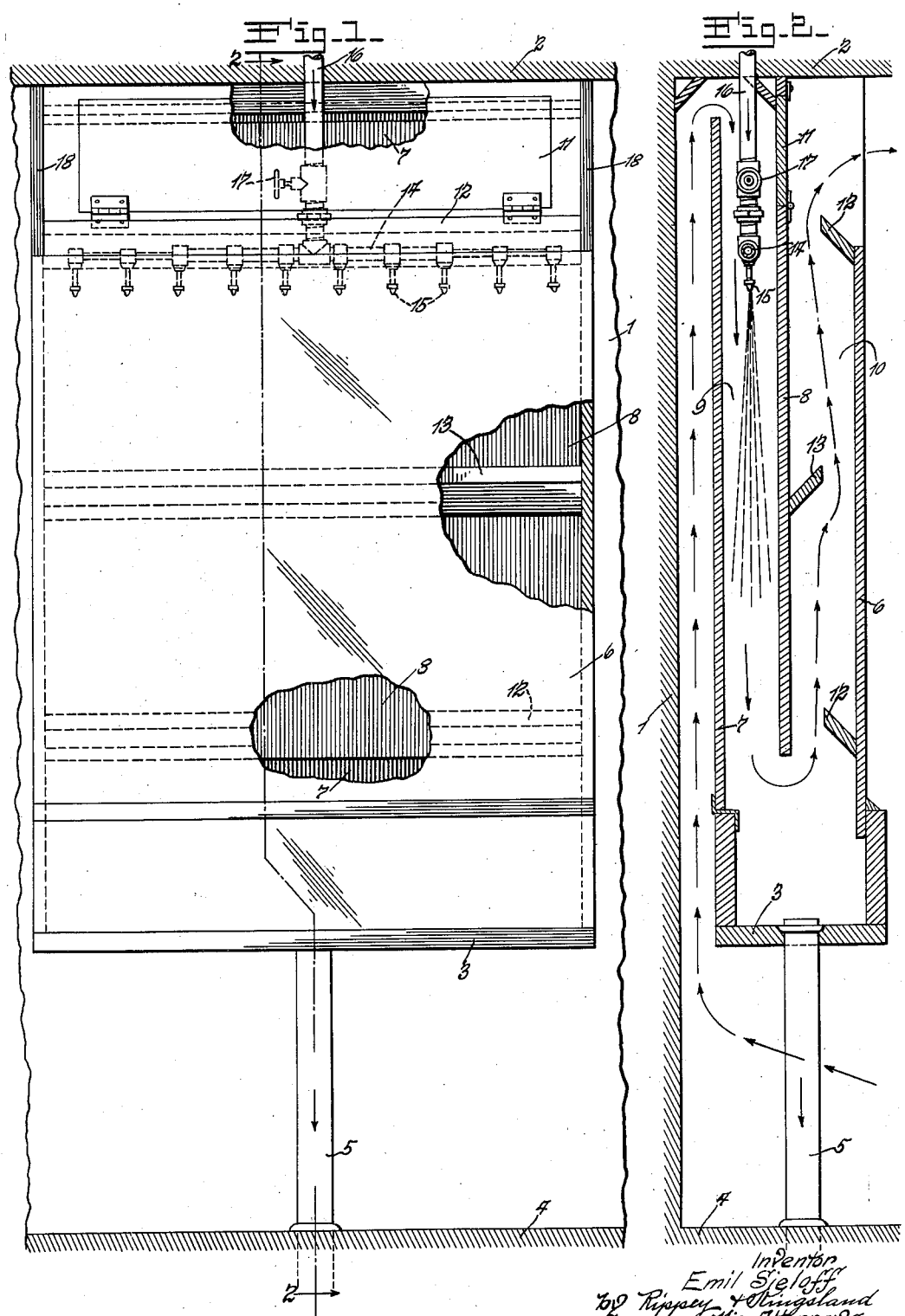

Patented Mar. 12, 1935

1,994,078

UNITED STATES PATENT OFFICE 1,994,078

REFRIGERATING SYSTEM

Emil Sieloff, St. Louis, Mo., assignor to Sieloff Packing Company, St. Louis, Mo., a corporation of Missouri Application February 11, 1933, Serial No. 656,230

1 Claim. (Cl. 261—116)

This invention relates to improvements in refrigerating systems, and consists of the novel construction hereinafter disclosed.

An object of the invention is to provide a system whereby air in a cooler chamber is circulated and cooled in order to produce a relatively low temperature in the cooling chamber.

Another object of the invention is to provide, in a refrigerating system, a cooling unit for withdrawing air from the lower part of a cooling chamber, passing the air in a downwardly moving stream in contact with a cooling spray, and then changing the path of the air to discharge the air in substantial volume at an elevation from the intake area to the unit.

Additional advantages of the construction will be apparent from the following detail description, taken in connection with the accompanying drawing, in which—

Fig. 1 is a front elevation of the refrigerating unit, parts being broken away and parts being shown in dotted lines in order to more fully disclose the invention.

Fig. 2 is a vertical section taken substantially on the line 2—2 of Fig. 1.

In the embodiment of the invention shown in the drawing, the cooling unit of the refrigerating system is shown installed in a cooling chamber and mounted against a side wall 1 and a ceiling wall 2 of said chamber. The side wall of the cooling chamber constitutes, in effect, the back wall of the refrigerating unit, and the ceiling wall 2 constitutes the top wall of the unit.

The refrigerating unit further includes a bottom wall in the form of an elongated trough 3 which is mounted and supported a substantial distance above the floor 4 of the cooling chamber in order to provide a substantial passage for air currents below the trough. The trough 3 may be connected with a discharge conduit 5 for discharging the accumulated liquid in the trough to a piping system. A front wall 6 is connected with the front wall of the trough 3 and extends upwardly, terminating at a substantial distance below the wall 2 in order to provide a rectangular passage outwardly into the chamber between the upper end of the wall 6 and the wall 2. A back wall 7 is connected to the back wall of the trough 3 and extends upwardly to a point above the termination of the wall 6 but at a spaced distance from the wall 2, thereby providing a passage between the upper edge of the wall 7 and the wall 2.

Between the walls 6 and 7 is an intermediate wall 8 that connects with the wall 2 and extends downwardly, terminating above the lower edge of the walls 6 and 7, thereby providing a passage above the trough 3 and between a chamber 9, formed by the walls 7 and 8, and a chamber 10, formed by the walls 6 and 8. In the upper part of the wall 8 is a hinged door 11 to provide access to the chamber 9 in which the spray equipment is located. The wall 6 carries a pair of inwardly and upwardly inclined baffle walls 12 extending into the chamber 10, and the wall 8 carries an inwardly and upwardly inclined baffle wall 13 likewise extending into the chamber 10. Near the top of the chamber 9 there is a transverse spray header 14 provided with a plurality of nozzles 15, the nozzles 15 being directed downwardly in the chamber 9. The spray header 14 is connected with a supply pipe 16 controlled by a valve 17. Access to the valve 17 is obtained through the hinged door 11 so that it may be manually controlled by an operator operating the device.

It will be understood that the supply pipe 16 is connected with a brine tank, the brine liquid being cooled by any suitable refrigerating means such, for example, as the expansion coils of a refrigerating system; that the liquid is advanced from the brine tank by a pump so that the brine liquid is discharged from the nozzles 15 across the upper part of the chamber 9 in a spray under pressure; and that the temperature of the discharged liquid is reduced to a sufficient degree to cause a substantial cooling effect on the air passing downwardly in the chamber 9. In practice, the exit temperature of the brine from the nozzles 15 should be approximately in the range from 15° to 20° Fahrenheit. The ends of the unit are closed by end walls 18.

From the foregoing description of the construction, the operation of the system will be understood to be as follows: The supply pipe 16 is open, providing downwardly directed jets of cooled brine liquid in the chamber 9. The downward movement of the brine spray causes a suction of air at the upper end of said chamber 9, thus drawing a volume of air upwardly in the space between the back wall of the unit and the wall of the cooling chamber, which volume of air is then drawn downwardly in the chamber 9 in contact with the spray. The liquid separates from the air by gravity and accumulates in the trough 3, from which it is withdrawn through the discharge pipe 5. The air freed from the liquid spray is then forced out through the chamber 10 and out of the opening above the upper end of the wall 6. The air contacting with the baffles 12 and 13 is freed from entrained moisture so that, when it exits from the unit, it will be relatively free from humidity. The cold air is distributed into the cooling chamber and is drawn downwardly again by the currents of air set up by the unit within the chamber.

I am aware that the invention may be modified in numerous particulars without departing from the spirit and scope of the invention. I do not limit myself to the exact construction shown and described, but what I claim and desire to secure by Letters Patent is:—

In a cooling chamber having a side wall and a ceiling wall; a refrigerating unit comprising a rectangular box having a vertical back wall adjacent to and spaced from said side wall and having its upper edge spaced below said ceiling wall, a vertical front wall at a distance from said back wall and having its upper edge spaced below said ceiling wall, a bottom wall connecting the lower edges of said back and front walls, an intermediate wall extending downwardly from said ceiling wall between and spaced from said back and front walls and having its lower edge above said bottom wall, baffle walls in connection with said front wall extending upwardly toward said intermediate wall, a baffle in connection with said intermediate wall extending upwardly toward said front wall, a spray nozzle manifold between said back and intermediate walls and below the upper end of said back wall, and a series of spaced nozzles extending downwardly from said manifold.

EMIL SIELOFF.